(12) United States Patent
Chadha et al.

(10) Patent No.: US 6,983,047 B1
(45) Date of Patent: Jan. 3, 2006

(54) ECHO CANCELING SYSTEM FOR A BIT PUMP AND METHOD OF OPERATING THE SAME

(75) Inventors: Mandeep Singh Chadha, Austin, TX (US); Shawn Robert McCaslin, Buda, TX (US); Mile Milisavljevic, Austin, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 665 days.

(21) Appl. No.: 09/650,853

(22) Filed: Aug. 29, 2000

(51) Int. Cl.
*H04M 9/08* (2006.01)

(52) U.S. Cl. .................... 379/406.01; 379/406.06; 379/406.02; 370/289

(58) Field of Classification Search ............... 370/286, 370/289, 290, 291; 379/406.01, 406.05, 379/406.08, 406.02, 406.06, 406.11, 406.12, 379/406.13, 406.14, 390.02, 392.01, 391, 379/390.01, 400
See application file for complete search history.

(56) References Cited

U.S. PATENT DOCUMENTS

| | | | |
|---|---|---|---|
| 4,707,824 A | 11/1987 | Kanemasa | |
| 4,924,492 A | 5/1990 | Gitlin et al. | |
| 5,351,087 A | 9/1994 | Christopher et al. | |
| 5,353,279 A | 10/1994 | Koyama | |
| 5,396,517 A | 3/1995 | Yedid et al. | |
| 5,418,849 A | 5/1995 | Cannalire et al. | |
| 5,512,898 A | 4/1996 | Norsworthy | |
| 5,604,769 A | 2/1997 | Wang | |
| 5,610,909 A * | 3/1997 | Shaw ........................ | 370/291 |
| 5,631,899 A * | 5/1997 | Duttweiler .................. | 370/291 |
| 5,668,794 A * | 9/1997 | McCaslin et al. ........... | 370/288 |
| 5,732,107 A | 3/1998 | Phillips et al. | |
| 5,748,126 A | 5/1998 | Ma et al. | |
| 5,809,033 A | 9/1998 | Turner et al. | |
| 5,841,809 A | 11/1998 | Koizumi et al. | |
| 5,926,505 A * | 7/1999 | Long ......................... | 375/222 |
| 5,970,137 A * | 10/1999 | Le Damany et al. ....... | 379/388 |
| 6,208,671 B1 | 3/2001 | Paulos et al. | |
| 6,240,128 B1 | 5/2001 | Banerjea et al. | |
| 6,389,064 B1 | 5/2002 | Dholakia et al. | |
| 6,434,233 B1 | 8/2002 | Bjarnason et al. | |
| 6,526,139 B1 * | 2/2003 | Rousell et al. ......... | 379/406.03 |
| 6,532,289 B1 * | 3/2003 | Magid ................... | 379/406.01 |
| 6,573,940 B1 | 6/2003 | Yang | |
| 6,597,787 B1 * | 7/2003 | Lindgren et al. ...... | 379/406.05 |
| 6,628,738 B1 | 9/2003 | Peeters et al. | |

OTHER PUBLICATIONS

"Multirate Systems and Filter Banks." by P. P. Vaidyanathan, Prentice Hall Signal Processing Series. Chap. 5. Section 5.3. pp. 211-213. Jul. 1992.

(Continued)

*Primary Examiner*—Rexford Barnie (57) ABSTRACT

An echo canceling system, method of attenuating echo, and a bit pump and transceiver employing the system and method. The echo canceling system is couplable between a transmit and receive path of the bit pump and receives and attenuates the echo in a receive signal propagating along the receive path. In one embodiment, the echo canceling system includes a slave echo canceling stage that employs a filter coefficient to attenuate the echo. The echo canceling system also includes a separation circuit, coupled to the slave echo canceling stage, that generates data representing a residual echo substantially exclusive of the receive signal. The echo canceling system still further includes a master echo canceling stage, coupled to the separation circuit, that receives the data and modifies the filter coefficient based thereon.

14 Claims, 5 Drawing Sheets

OTHER PUBLICATIONS

Floyd M. Gardner "Interpolation in Digital Modems—Part I: Fundamentals" IEEE Transactoins on Communications, vol. 41, No. 3, Mar. 1993; pp. 501-507.

Lars Erup, et al. "Interpolation in Digital Modems—Part II: Implementation and Performance" IEEE Transactions on Communications, vol. 41, No. 6, Jun. 1993; pp. 998-1008.

James D. Barnette, et al.; U.S. Appl. No. 09/652,116, filed Aug. 29, 2000 entitled "Resampler for a bit Pump and Method of Resampling a Signal Associated Therewith"; pp. 1-59; 6 drawing sheets.

Mandeep Singh Chadha, et al.; U.S. Appl. No. 09/650,854, filed Aug. 29, 2000 entitled "Separation Circuit for an Echo Canceling System and Method of Operating the Same"; pp. 1-67; 6 drawing sheets.

James D. Barnette; U.S. Appl. No. 09/650,850, filed Aug. 29, 2000 entitled "An Interpolator. A Resampler Employing the Interpolator and Method of Interpolating a Signal Associated Therewith"; pp. 1-78; 5 drawing Sheets.

Mandeep Singh Chadha, et al.; U.S. Appl. No. 09/650,851, filed Aug. 29, 2000 entitled "Filter Circuit for a Bit Pump and Method of Configuring the Same" pp. 1-57; 7 drawing sheets.

* cited by examiner

ECHO CANCELING SYSTEM FOR A BIT PUMP AND METHOD OF OPERATING THE SAME

CROSS-REFERENCE TO RELATED APPLICATION

This U.S. application is related to the following U.S. applications.

| Ser. No. | Reference Number | File Date | Title |
| --- | --- | --- | --- |
| 09/650,851 | Chadha 1-1-1-1 | 08/29/2000 | FILTER CIRCUIT FOR A BIT PUMP AND METHOD OF CONFIGURING THE SAME |
| 09/650,854 | Chadha 2-2-2 | 08/29/2000 | SEPARATION CIRCUIT FOR AN ECHO CANCELING SYSTEM AND METHOD OF OPERATING THE SAME |
| 09/652,116 | Barnette 2-2 | 08/29/2000 | RESAMPLING FOR A BIT PUMP AND METHOD OF RESAMPLING A SIGNAL ASSOCIATED THEREWITH |
| 09/650,850 | Barnette 1 | 08/29/2000 | AN INTERPOLATOR, A RESAMPLER EMPLOYING THE INTERPOLATOR AND METHOD OF INTERPOLATING A SIGNAL ASSOCIATED THEREWITH |

The above-referenced U.S. applications are commonly assigned with the present invention and incorporated herein by reference.

TECHNICAL FIELD OF THE INVENTION

The present invention is directed, in general, to digital signal processing and, more specifically, to an echo canceling system for a bit pump and a transceiver employing the bit pump.

BACKGROUND OF THE INVENTION

The existing public switched telephone network represents a significant capital investment that has taken place in great part over the last 80 years. The public switched telephone network was originally designed for voice services (so-called plain old telephone service) and was entirely analog.

Originally, the public switched telephone network included "local loops," which connected homes and businesses to central office switches. This allowed anyone having a telephone connected to the central office switch to call one another. A given central office typically only covers a relatively small area.

To allow people to call one another from greater distances, central office switches were interconnected by analog trunks. Unfortunately, signal quality suffered greatly as distances increased. Filters and amplifiers improved quality, but only to a limited extent.

Over time, however, the analog trunks (that may be thought of as forming the "backbone" of the public switched telephone network) were replaced with land-based microwave, satellite and optical fiber links. Public switched telephone network signals ("traffic") were digitized for transmission over the backbone, significantly improving signal quality, service and reliability.

To maximize utilization of the backbone, an assumption was made that, at the time, seemed straightforward. The assumption was based on the observation that public switched telephone network traffic consisted of human speech, which by its nature occupies frequencies below 4 kilohertz (kHz).

Thus, it was decided that higher frequencies were of limited value and represented a waste of bandwidth if the traffic were to be digitized and transmitted. The higher frequencies were, as a result, discarded when signals were initially digitized. The net effect was that more conversations were carried over a given microwave, satellite or fiber link.

While truncating the frequencies above 4 kHz was of no consequence to the transmission of speech, the same proved not to be true for data. In the quest for speed, computer modems have attempted to use as much bandwidth as possible, and in the most clever manner. Unfortunately, even in view of the most clever modems, the 4 kHz digitization cutoff has imposed an apparent limit on the speed of such devices. Unfortunately, the analog local loops have unjustly taken most of the blame for the speed limitation.

Digital subscriber line (DSL), developed over the past few years, presents a novel solution to the speed limitation conundrum. According to DSL, local loops are employed to carry speech in a stream at normal frequencies (exclusively below 4 kHz). The local loops, however, are also called upon to carry data in a stream at frequencies exclusively above 4 kHz. DSL termination circuits located at the home or business and the central office combine and separate the voice and data streams as they enter and leave the local loop. Once separated at the central office, the voice stream is digitized for relay over the public switched telephone network backbone as before, and by employing the existing infrastructure. The data stream, however, is sent through the public switched telephone network or another network (such as the Internet via a different path), without imposition of the 4 kHz artificial bandwidth limits.

One form of DSL, Asymmetrical DSL (ADSL) was designed with the Internet particularly in mind and accordingly emphasizes downloading of data over uploading of data (which is the nature of Internet "surfing"). ADSL uses the frequency spectrum between 0–4 kHz for the plain old telephone service stream and 4 kHz to 2.2 MHZ for the data stream. Depending on the design, length and conditions of the local loop, ADSL can offer speeds up to 9 Mbits/s (Mbps) for downstream (network to user) and up to 800 Kbps for upstream (user to network) communication.

Another form of DSL, High-Bit Rate DSL (HDSL) is a technology extension of DSL. HDSL is a symmetric transport medium, meaning that it provides 1.544 Mbps transmission speed both downstream and upstream over distances as far as 12,000 feet, without repeaters. Because about 20% of loops are longer than 12,000 feet, the industry has developed a repeater for HDSL that effectively doubles the span's reach to 24,000 feet. HDSL is based on a technology called adaptive equalization, which digitally analyzes and then compensates for distortion, imperfections in the copper line itself as well as adverse environmental conditions, throughout the transmission process. Furthermore, HDSL transmits full-duplex signals on each pair of wire and uses echo cancellation to separate the receive signals from the transmit signals.

To enhance and build on that inherent symmetry, standards bodies are now working on HDSL's next generation, called HDSL2. HDSL2 promises full-duplex T-Carrier 1 (T1) payload over one copper loop, while still delivering the same time and cost efficiencies for T1 deployment that HDSL offers. Carriers everywhere are running out of copper in their local loop plants. One of HDSL2's key benefits will focus squarely on and alleviate that concern. Essentially, the technology will double the number of available T1 lines because it requires only a single copper pair, compared with the two pairs required by the standard HDSL. As a result, HDSL2 may replace standard HDSL for most T1 deployments in the future, although HDSL will remain an option in those cases in which there may still be some engineering reasons for deploying a two-loop solution. One example is with long loops in excess of 12,000 feet, where span-powered HDSL repeaters may still be necessary. Beyond just workhorse T1 deployment, HDSL2 also should prove to be a viable competitive technology for Internet access applications that require symmetrical data delivery.

HDSL2, therefore, further enhances the noteworthy advantages associated with DSL. First, DSL-based technology does not require local loops to be replaced. Second, DSL-based technology overcomes the 4 kHz digitization barrier without requiring changes to existing public switched telephone network voice-handling equipment. Third, DSL-based technology requires relatively little equipment to combine and later separate speech and data streams.

Fourth, DSL-based technology allows speech and data to occur simultaneously over the same local loop. HDSL2 now promises full-duplex payload over one copper loop, while still delivering the same time and cost efficiencies for T1 deployment that its predecessor, HDSL, offers.

Some technical challenges, however, remain for HDSL2. One is designing a transceiver that can accommodate the full-duplex T1 payload in conjunction with the standard defined by American National Standards Institute (ANSI) committee T1E1.4 (June 1995), which is incorporated herein by reference. In conjunction therewith, echo cancellation techniques may be employed in the digital signal processing portion of the transceiver to reduce the magnitude of an echo associated with the information transmitted over the HDSL2 network.

For a DSL-based system, an echo of the transmit signal usually occurs at the point where the transmit path and the receive path are joined together. A hybrid circuit, typically used to connect these two paths to the twisted-pair telephone line, generates the echo which propagates down the receive path along with any receive signal from the far end. An echo may easily be 15 decibels (dB) greater than a strong receive signal thereby making processing of the receive signal at least more difficult. As the receive signal becomes weaker, acceptable processing of the receive signal becomes even more difficult due to the overriding effects of the echo.

Therefore, echo cancellation is usually employed in a transceiver employed in the DSL-based system.

Digital adaptive echo cancellers are located between the transmit path and the receive path thereby operating in parallel with an echo. The echo canceller synthesizes the echo path, which may include a digital-to-analog converter, a transmitter filter, the hybrid circuit, a receiver filter and an analog-to-digital converter. The echo canceller is called upon to produce a replica of the echo using the same transmit data but having a reversed polarity to cancel the real echo.

Additionally, the echo canceller should have the ability to track and compensate for changes in the hybrid circuit and transmission line to maintain a satisfactory level of performance. This task is often made more difficult due to high levels of disturber signals, which are signal sources of crosstalk noise. One of the highest interferers to the echo is the receive signal from the far end. This condition generally occurs when the echo canceller is attempting to cancel an echo and a large signal from the far end occurs thereby introducing a response transient into the echo canceller. The echo canceller employs coefficients that are typically adaptable by employing a method analogous to the method for conditioning the coefficients during activation of the system. Interference, caused by receive signals from the far end, is usually mitigated by reducing the update gains during operational tracking.

This approach has a fundamental problem with the speed and adaptability of the updates. When disturber levels are high, update gains are made small to prevent drift in the echo canceller coefficients. The reduction of the echo canceller update gain, however, results in an improper response for higher update values thereby lowering the ability of the echo canceller to track the necessary changes. Therefore, the combination of lower update gains and higher disturber levels results in an echo being canceled with less precision thereby lowering the overall performance of the transceiver.

Accordingly, what is needed in the art is an echo canceling system employable in the digital signal processing portion of a transceiver that provides a way for effective, high-fidelity tracking of changes in the echo path to facilitate communication over, for instance, a network employing DSL-based technology such as HDSL2.

SUMMARY OF THE INVENTION

To address the above-discussed deficiencies of the prior art, the present invention provides an echo canceling system, method of attenuating echo, and a bit pump and transceiver employing the system and method. The echo canceling system is couplable between a transmit and receive path of the bit pump and receives and attenuates the echo in a receive signal propagating along the receive path. In one embodiment, the echo canceling system includes a slave echo canceling stage that employs a filter coefficient to attenuate the echo. The echo canceling system also includes a separation circuit, coupled to the slave echo canceling stage, that generates data representing a residual echo substantially exclusive of the receive signal. The echo canceling system still further includes a master echo canceling stage, coupled to the separation circuit, that receives the data and modifies the filter coefficient based thereon.

The present invention introduces, in one aspect, an echo canceling system employable in a bit pump (the digital signal processing portion) of a transceiver in an exemplary environment of a high-bit-rate digital subscriber line service over a single twisted pair wire (commonly referred to as HDSL2). The echo canceling system advantageous employs master and slave echo canceling stages (e.g., hybrid digital filters) and a separation circuit to attenuate the echo. The separation circuit distinguishes a residual echo (or a residual level of the echo) from the receive signal for use by the master echo canceling stage to adapt filter coefficients employable by the slave echo canceling stage to attenuate the echo. As a result, the echo canceling system reduces the echo to levels not previously attainable, thereby increasing the fidelity of communication traffic (e.g., voice, video or data) traversing a network employing the bit pump. In one embodiment of the present invention, the master and slave echo canceling stages receive a transmit signal from the transmit path. In a related embodiment, the transmit signal is delayed to the master echo canceling stage. To serve their intended purpose, the master and slave echo canceling stages are interposed between the transmit and receive path of the bit pump.

For reasons that will become more apparent, the transmit signal is delayed to the master echo canceling stage to assist the separation circuit in delineating the residual echo.

In one embodiment of the present invention, the separation circuit includes an equalizer/slicer stage that determines a symbol associated with the receive signal. In a related embodiment, the separation circuit further includes an estimator stage, coupled to the equalizer/slicer stage, that employs the symbol and develops an estimated receive signal. In yet another related embodiment, the master echo canceling stage generates an echo canceling signal and the separation circuit generates the data representing the residual echo as a function of the estimated receive signal, the echo canceling signal and a delayed receive signal.

In one embodiment of the present invention, the master and slave echo canceling stages each include finite impulse response filters and infinite impulse response filters. In a related embodiment, the master and slave echo canceling stages each include a DC canceller. Of course, other echo canceling architectures may be employed in the master and echo canceling stages depending on the requirements associated with a particular application.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
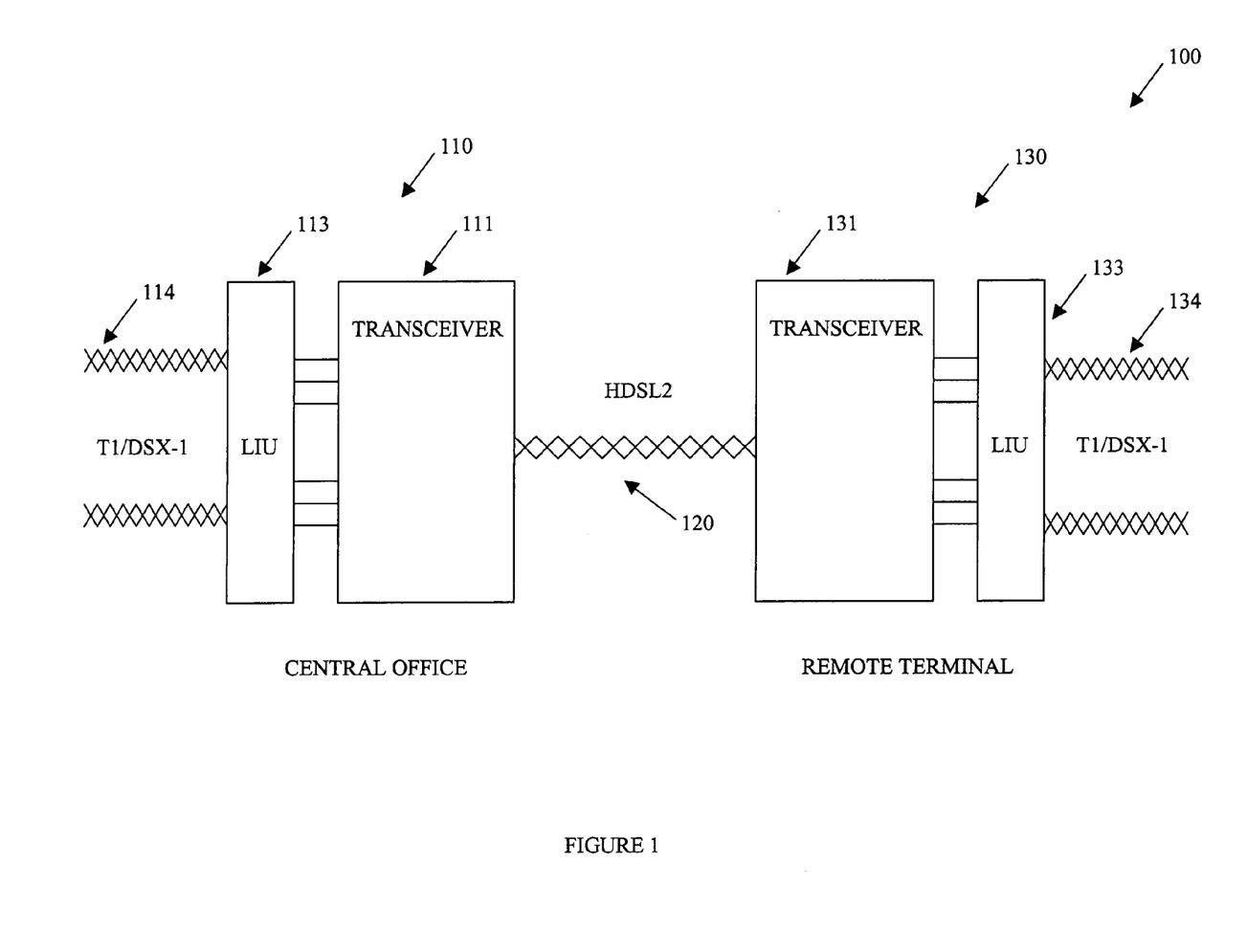
FIG. 1 illustrates a system level diagram of an embodiment of a communications network within which an embodiment of a transceiver constructed according to the principles of the present invention may operate.

Referring initially to FIG. 1, illustrated is a system level diagram of an embodiment of a communications network, generally designated 100, within which an embodiment of a transceiver constructed according to the principles of the present invention may operate. The communications network 100 may form a portion of a larger communications network (e.g., the public switched telephone network) and may advantageously provide high-bit-rate digital subscriber line service over a single twisted pair wire (commonly referred to as HDSL2). The communications network 100 includes a central office 110 and a remote terminal 130. The central office 110 embodies any conventional or later developed switching system that facilitates communications over the communications network 100. The remote terminal 130 embodies any conventional or later developed communications device (e.g., a multimedia personal computer) adapted to communicate with the communications network 100. It should be understood that the central office 110 may be advantageously coupled to a plurality of remote terminals 130.

The central office 110 is coupled via one or more central office trunks (one of which is designated 114) to the public switched telephone network. The central office trunks 114 are designated as either T1 long haul or DSX-1 short haul trunks for illustrative purposes only. The central office trunks 114 are coupled via a central office line interface unit 113 to a central office transceiver 111.

The remote terminal 130 is coupled via one or more remote terminal trunks (one of which is designated 134) to the public switched telephone network. The remote terminal trunks 134 are also designated as either T1 long haul or DSX-1 short haul trunks for illustrative purposes only. The remote terminal trunks 134 are coupled via a remote terminal line interface unit 133 to a remote terminal transceiver 131.

The central office 110 is coupled to the remote terminal 130 via a single twisted pair wire (or single copper loop) 120 adapted to carry the high-bit-rate digital subscriber line service. The central office and remote terminal transceivers 110, 130 provide the requisite signal processing and other core functions to support the high-bit-rate digital subscriber line service. Those skilled in the art should understand that the communications network 100 is submitted for illustrative purposes only and other network configurations (including communications networks compatible with digital subscriber line service) are well within the broad scope of the present invention.

Figure 2:
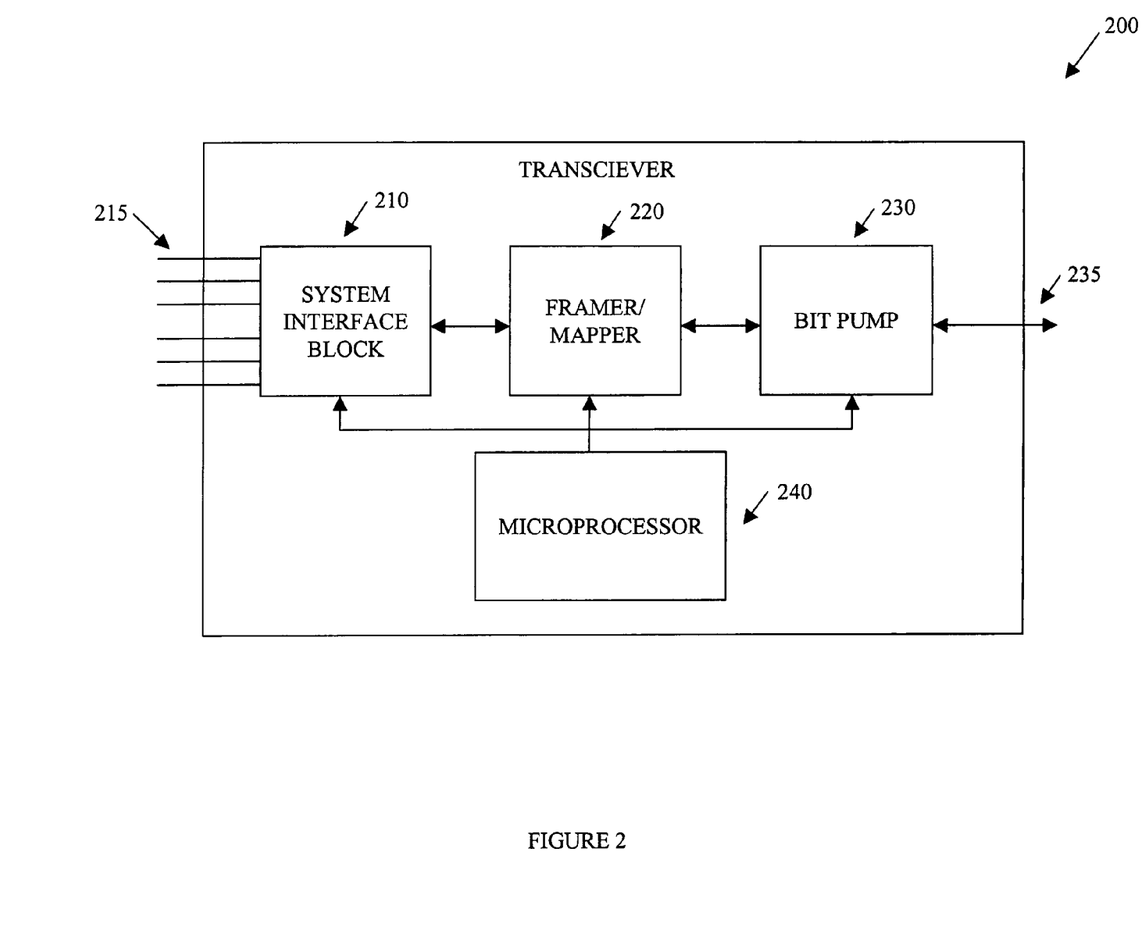
FIG. 2 illustrates a block diagram of an embodiment of a transceiver constructed according to the principles of the present invention.

Turning now to FIG. 2, illustrated is a block diagram of an embodiment of a transceiver 200 constructed according to the principles of the present invention. The transceiver 200 includes a system interface block 210 that provides an interface to, for instance, the public switched telephone network via T1 trunks (one of which is designated 215). The system interface block 210 can support any one of a number of transport medium and standards in addition to the T1 payload. The system interface block 210 performs system level functions such as processing commands/status information and providing connectivity to an embedded operations channel and an external system processor. The embedded operations channel is typically a virtual communications channel embedded in the physical layer for inter-transceiver and network maintenance purposes. The external system processor, in conjunction with an internal microprocessor, configures the transceiver 200 and monitors the operational status of the transceiver 200.

The transceiver 200 also includes a framer/mapper 220 coupled to the system interface block 210. The framer/mapper 220 provides transmission convergence between the standard interface block 210 and the frames associated with the information traversing a twisted pair wire (e.g., the HDSL2 frames). In conjunction therewith, the framer/mapper 220 provides frame synchronization, bit stuffing, jitter control processing and rate correction. The framer/mapper 220 also multiplexes/demultiplexes the channels associated with the transceiver 200, provides payload error detection and scrambles/descrambles signals in accordance with a particular application. Thus, the framer/mapper 220 is principally responsible for the transmission convergence within the transceiver 200.

The transceiver 200 further includes a bit pump 230 coupled to the framer/mapper 220. The bit pump 230 is the digital signal processing portion of the transceiver 200 and is coupled, via an analog front end, to a twisted pair wire 235 adapted to carry the high-bit-rate digital subscriber line service. A transmit path of the bit pump 230 receives data bits from the framer/mapper 220 and converts the bit stream into, for instance, 72× oversampled, 3-bit data for transmission by a digital-to-analog converter associated with the analog front end over the twisted pair wire 235. A receive path of the bit pump 230 receives the 3-bit, 72× oversampled received data from an analog-to-digital converter associated with the analog front end and converts the received data to an output bit stream for delivery to a deframer and, ultimately, to the framer/mapper 220.

The bit pump 230 generally performs two classes of signal processing, namely, symbol-time referenced and symbol-time independent processing. The symbol-time referenced processing includes functions like echo cancellation and equalization whereas symbol-time independent processing includes functions like transmitter digital sigma/delta modulation. An architecture associated with an embodiment of a bit pump 230 will be described with respect to FIG. 3.

The transceiver 200 still further includes a controller (e.g., an on-chip control microprocessor) 240 coupled to the system interface block 210, the framer/mapper 220 and the bit pump 230.

The controller 240 communicates with and coordinates the operations between the system interface block 210, the framer/mapper 220 and the bit pump 230. For instance, the controller 240 performs the initialization process for the transceiver 200 by, among other things, initializing selected registers in the framer/mapper 220 and the bit pump 230 to a known state. The controller 240 generally writes or reads data to/from the mapper/framer 220 and the bit pump 230 using a memory mapped input/output operation through a peripheral bridge. While the read/write memory operation is intended to be used in debugging, characterization and production testing, it is not generally employed in end user applications, except for a built-in self testing mode.

The controller 240, however, has access to and updates the registers of the framer/mapper 220 and bit pump 230 during activation (including initialization) and communication phases of the transceiver 200. The controller 240 receives information such as performance characteristics and bit pump attributes (e.g., filter lengths, gains and signal scale factors) and provides control commands to control the transceiver 200. With regard to the bit pump 230, for instance, the controller 240 provides control commands to, without limitation, enable coefficient updates, select update gains, enable convolution and delay line updates, and probe node selection. Once the transceiver 200 reaches data transparency (i.e., showtime), however, the bit pump 230 can process data without continuing intervention from the controller 240, assuming no exception event occurs. Regarding the system interface block 210, the controller 240 accesses system command and status registers used for configuration and control reset, diagnostics, activation, embedded operations channel processing and other functions. The controller 240 is also intricately involved in synchronizing the operation of the components and systems during all phases of operation of the transceiver 200.

It should be understood that the representative transceiver 200 is submitted for illustrative purposes only and other transceiver configurations compatible with the principles of the present invention may be employed as the application dictates.

Figure 3:
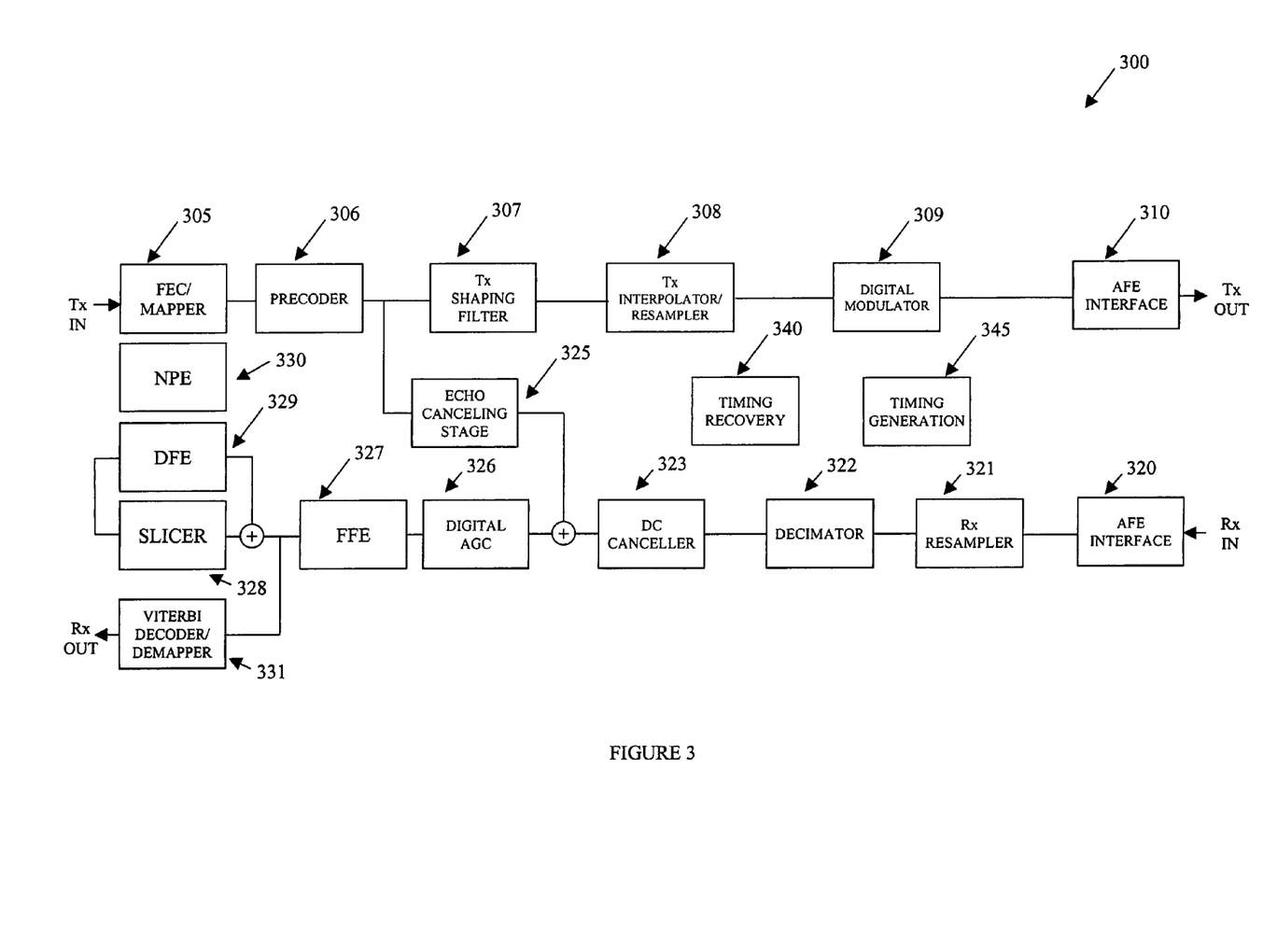
FIG. 3 illustrates a block diagram of an embodiment of a bit pump constructed according to the principles of the present invention.

Turning now to FIG. 3, illustrated is a block diagram of an embodiment of a bit pump 300 constructed according to the principles of the present invention. Again, the bit pump 300 primarily performs the digital signal processing functions associated with a transceiver and includes a transmit path and a receive path. While various blocks of the bit pump 300 are illustrated and described with respect to a transmitter or receiver portion of the bit pump 300, it should be understood that the circuits and systems that constitute the respective blocks perform functions on signals that span the bit pump 300 whether propagating along the transmit or receive path. Additionally, the functions associated with each block of the bit pump 300 are not necessarily discrete in nature. As will become more apparent, the functions are often integrated and resources are drawn from one functional block in the context another block to achieve the intended purpose. Finally, it should be understood that the circuits and systems associated with the present invention may be embodied in software, dedicated or hardwired discrete or integrated circuitry, or combinations thereof.

The bit pump 300 includes a forward error correction/mapper 305 coupled to an input of the transmit path. A signal presented at the input of the transmit path may be subject to various types of noise, in particular impulse noise, which is characteristically of short duration, but has a strong magnitude and a wide spectrum footprint. To provide a more reliable link, it is desirable to use a forward error correction coding techniques (e.g., a Reed-Solomon code) which are known to support reliable impulse noise resistance. Furthermore, the impulse noise immunity may be multiplied by a factor without additional redundancy by using forward error correction coding in conjunction with interleaving, where the factor is referred to as the depth of interleaving. Thus, the forward error correction/mapper 305 provides the forward error correction to a transmit signal presented at the input of the transmit path of the bit pump 300.

The bit pump 300 also includes a precoder 306 coupled to the forward error correction/mapper 305 in the transmit path. The precoder (e.g., commonly referred to as a channel precoder in the HDSL2 standard defined by the ANSI committee T1E1.4) is generally a fixed, non-linear filter that effectively implements a decision feedback equalization function in the transmitter portion of the bit pump 300. More specifically, the precoder 306 pre-distorts the transmitted signal so that after a corresponding receive signal propagating along the receive path passes through a feed forward equalization stage, there is insignificant post-cursor intersymbol interference distortion (or interference between adjacent data symbols caused by path distortion).

The precoder 306 is programmed by a controller of a transceiver (analogous to the controller 240 described with respect to FIG. 2) with decision feedback equalization coefficients that are calculated within the receiver portion of the bit pump 300 during activation. A motivation for using the precoder (e.g., a Tomlinson-Harashima precoder) 306 in lieu of a decision feedback equalizer at showtime is that the decision feedback equalization function is incompatible with a Viterbi decoder. To simultaneously realize the coding gain provided by a Viterbi decoder and the intersymbol interference cancellation provided by a decision feedback equalizer without noise enhancement, either the decision feedback equalizer should be replaced with the precoder 306 at showtime or the Viterbi decoder and decision feedback equalizer should be replaced with a reduced-state sequence detector. The precoder 306 is typically more efficient than the reduced-state sequence detector and, as such, the bit pump 300 employs the precoder 306 in the transmitter portion thereof.

The precoder 306, therefore, also employs a decision feedback equalizer 329 and noise prediction equalizer 330 associated with the receiver portion of the bit pump 300. The decision feedback equalizer 329 and noise prediction equalizer 330 are trained during activation to perform equalization in conjunction with other tasks necessary to operate the bit pump 300 and then reconfigured (by a controller command) at showtime to perform the functions associated with the precoder 306. Thus, the complexity of the precoder 306 is reduced. An input signal to the precoder 306 includes symbols from the forward error correction/mapper 305 and an output of the precoder 306 is a substantially white, uniform distributed signal sampled at the symbol rate.

The bit pump 300 also includes a transmitter shaping filter 307 coupled to the precoder 306 in the transmit path. The transmitter shaping filter 307 is a typically a finite impulse response (non-adaptive) digital filter that receives data at a 1× rate, interpolates to a 4× rate, and shapes the power spectrum density of the resulting 4× rate signal. The finite impulse response filter is programmable (i.e., the filter coefficients are stored in random access memory/registers) and the default settings for the transmitter shaping filter 307 are generally unknown, meaning that the transmitter shaping filter 307 is programmed by the controller at powerup. In an exemplary embodiment of the present invention, the transmitter shaping filter 307 can accommodate DSL-based technology and is compatible with the requirements associated with HDSL2. For instance, the length of the filter (e.g., 128 taps) is designed to meet the requirements associated with HDSL2.

The programmability of the transmitter shaping filter 307 provides several advantages for the bit pump 300. First, it allows the bit pump 300 to be applied in multi-rate or repeater applications. It also allows the system signal-to-noise ratio slicer margins to be improved when reductions can be made in component tolerances in the line interface to the bit pump 300.

That is, tighter tolerances allow the transmit spectra to be refined to be closer to the upper bound set forth in the HDSL2 standard.

The bit pump 300 also includes a transmitter interpolator/resampler 308 coupled to the transmitter shaping filter 307 in the transmit path. The transmitter interpolator/resampler 308 upsamples the output of the transmitter shaping filter 307 to a sampling rate compatible with a digital modulator 309 coupled thereto. The architecture of the transmitter interpolator/resampler 308 generally employs a multiplier-free architecture based on a cascaded-integrator-comb interpolator [see, for instance, "An Economical Class of Digital Filters for Decimation and Interpolation," by E. B. Hogenauer, Institute of Electronic and Electrical Engineers (IEEE) Transactions on Acoustics, Speech, and Signal Processing, Vol. ASSP-29, No. 2, April 1981, which is incorporated by reference] to upsample from $4*F_{baud}$ to $72*F_{baud}$ followed by a first order Lagrange (linear) interpolator to resample the $72*F_{baud}$ output. The interpolator, therefore, increases the sampling rate by a factor of 18 (i.e., 72/4).

When determining the order (length) of the cascade-integrator-comb interpolator, there are generally two considerations, namely, the image attenuation and the passband droop. The interpolator is designed to suppress the images of the baseband signal such that the signals are below the level of the shaped quantization noise floor of the digital modulator 309. A fourth order cascade-integrator-comb interpolator should be adequate to ensure that the images in the transmit path are below (~5 dB) the level of the quantization noise.

Once the interpolation filter is chosen, any passband droop caused by that filter can be compensated for in the transmit path and typically by the transmitter shaping filter 307. While the compensation function increases the peak to root-mean-square ratio of the transmitter shaping filter 307, it does not significantly alter the peak to root-mean-square ratio of a signal arriving at the digital modulator 309 since the extra peaking added to compensate for the droop is removed by the cascaded-integrator-comb interpolator prior to reaching the digital modulator 309.

In addition to the above considerations, the overall gain of the cascaded-integrator-comb interpolator should be compensated for in the transmit path. The cascaded-integrator-comb interpolator in conjunction with the coefficients associated with the transmitter shaping filter 307 should be adequate to compensate the overall gain.

The resampler section (e.g., a linear interpolating resampler) of the transmitter interpolator/resampler 308 resamples the output of the interpolator according to the sampling phase and input delay-line shifts specified by a timing generator 345 associated with the bit pump 300. Thus, the transmitter interpolator/resampler 308 provides sampling phase and frequency corrections to the transmit signal for delivery to the digital modulator 309.

The digital modulator (e.g., a second order modulator) 309, coupled to the transmitter interpolator/resampler 308 in the transmit path, generally produces a 5-level output signal with the quantization noise shaped to minimize the noise in the passband. A transmitter analog-front-end interface 310 receives the 5-level quantized output signal from the digital modulator 309, converts the signal to an analog signal (via a digital-to-analog converter) and provides an interface at an output of the transmit path of the bit pump 300. Both the digital modulator 309 and the transmitter analog-front-end interface 310 typically operate on a common 144× clock, with a transfer rate of 72× (the sample rate) desired. To facilitate this, the transmitter analog-front-end interface 310 generates a 72× sample transfer clock signal and the 5-level quantized output is coded into three bits. The output data from the bit-pump 300 changes at the rising edge of the sample transfer clock signal and the transmitter analog-front-end interface 310 should sample the digital modulator 309 output data at the falling edge of the sample transfer clock signal.

Turning now to the receiver portion of the bit pump 300, a receiver analog-front-end interface 320 is coupled to an input of the receive path of the bit pump 300. The receiver analog-front-end interface 320 receives an analog signal from an HDSL2 path and converts the signal to a digital signal via a analog-to-digital converter associated therewith. The analog-to-digital converter and the bit pump 300 typically operate on a common 144× clock and a transfer rate of 72× (the sample rate) is desirable. The output of the analog-to-digital converter advantageously includes three single-bit outputs, which are grouped into a three-bit bus. The data at the output of the receiver analog-front-end interface 320 transitions at the rising edge of the clock pulse and the bit-pump 300 samples the analog-to-digital converter input data at the falling edge of the clock pulse.

The bit pump 300 also includes a receiver resampler 321 coupled to the receiver analog-front-end interface 320 in the receive path. The receiver resampler (including, for instance, a third order LaGrange interpolation stage and a linear interpolating stage) 321 merges the three outputs of the analog-to-digital converter from the receiver analog-front-end interface 320 into a single output and resamples the signal to phase-lock the sampling phase associated with a remote terminal and central office of a communication network employing the bit pump 300. In the central office, the transmit and receive timing is generally locked to a local oscillator and therefore fractional resampling is unnecessary. In the remote terminal, the signals associated with the timing generator 345 and receiver resampler 321 necessitate sampling phase, input delay-line shifts and output sample production times to synchronize a derived symbol clock to the remote terminal's local oscillator associated with the timing generator 345.

THE bit pump 300 also includes a decimator 322 coupled to the receiver resampler 321 in the receive path. The decimator 322 downsamples the output of the receive resampler 321 from the $72*F_{baud}$ to a $2*F_{baud}$ symbol rate. The decimator 322 generally includes the following cascaded filter elements, namely, a cascaded-integrator-comb decimator to downsample from $72*F_{baud}$ to $8*F_{baud}$, a fifth order power-symmetric decimation filter to decimate from $8*F_{baud}$ to $4*F_{baud}$, and a seventh order power-symmetric decimation filter to decimate from $4*F_{baud}$ to $2*F_{baud}$.

The first decimation filter element uses a multiplier-free architecture based on the cascaded-integrator-comb filter structure analogous to the structure employed in the transmitter interpolator/resampler 308. The following two factors may be used to determine the decimation ratio and cascaded-integrator-comb filter order, namely, the quantization noise aliasing and the passband attenuation. In general, the lower the output sample rate, the greater the attenuation at the edge of the passband for a fixed bandwidth passband. For instance, employing a cascaded-integrator-comb decimation ratio of 18 to produce a $4*F_{baud}$ output, the attenuation at the edge of the passband in the signal received by the remote terminal would be ~2.8 dB for a filter that would provide ~68 dB of quantization noise suppression. If instead a cascaded-integrator-comb decimation ratio of nine is selected, the attenuation at the edge of the passband is reduced to ~0.7 dB with ~95 dB quantization noise suppression. To keep the decimator 322 from hindering the analog-digital-converter performance, a decimation ratio of nine and a filter order of five is suggested.

The second decimation filter element uses a canonical-signed-digit multiplier architecture based on the power-symmetric elliptic impulse response filter structure. Although such filters are based on equiripple, elliptic filters, the resulting filter from coefficient quantization is generally not considered elliptic since passband and stopband are no longer equiripple. Nevertheless, the power-symmetric property is maintained after coefficient quantization. It is this property that ensures that for an acceptable stopband attenuation, passband ripple will be insignificant. The second decimation filter is a fifth order power-symmetric decimation filter.

The third decimation filter element also uses a power-symmetric infinite impulse response filter structure. The third decimation filter is a seventh order power-symmetric decimation filter. Thus, the decimator 322 allows sampling phase and frequency corrections to be made on the receive signal propagating along the receive path. For a better understanding of the design criteria associated with such filter elements, see "Multirate Systems and Filter Banks," by P. P. Vaidyanathan, Prentice Hall Signal Processing Series, Chap. 5, Section 5.3, pp. 211–213, July 1992, which is incorporated herein by reference.

The bit pump 300 also includes a DC canceller 323 coupled to the decimator 322 in the receive path. In presence of fixed-point elements, such as a digital-to-analog converter, there is a possibility of a parasitic DC component in a canceled echo signal.

While this component does not affect the residual echo root-mean-square value, it presents a concern regarding a feed forward and decision feedback equalization combination due to the lack of a transmitted signal. This artifact may account for as much as 1 dB of slicer mean squared errors at steady state operation. The DC canceller 323 (including, for instance, a single tap least-mean-square filter adapting to the steady value of one) is designed to reduce this degradation.

The bit pump 300 also includes an echo canceling stage 325 interposed between the transmit and receive path. The echo canceling stage 325 substantially cancels linear echo over the full dynamic range of the bit pump 300. The echo canceling stage 315 may be partitioned into master and slave echo canceling stages (e.g., hybrid digital filters) to assist in further defining and ultimately reducing the echo. Inasmuch as an explanation of an embodiment of an echo canceling stage 325 follows with respect to FIG. 4, a detailed discussion will not herein be submitted.

The bit pump 300 also includes a digital automatic gain controller 326 coupled to the DC canceller 323 in the receive path. The digital automatic gain controller 326 allows the bit pump 300 to process the data precisions that follow the echo canceling stage 325. The digital automatic gain controller 326 also employs a least-mean-square algorithm to train a feed forward equalization function without normalization.

More specifically, the digital automatic gain controller 326 limits the probability of clipping (generally the signal peaks of the analog-to-digital and digital-to-analog converters) to a desired level by means of fixing the output signal variance. A secondary effect of this operation is to alleviate the need for error normalization in feed forward equalization least-mean-square algorithm and to reduce the dynamic range requirement for feed forward equalization coefficients.

The bit pump 300 also includes an equalizer coupled to the DC canceller 323 and the echo canceling stage 325 in the receive path. The equalizer includes a feed forward equalizer 327, decision feedback equalizer 329 and a noise prediction equalizer 330. The feed forward equalizer 327 cooperates with the decision feedback equalizer 329 to whiten noise and equalize a linear distortion associated with the receive path. For instance, with 384 taps, the feed forward equalizer 327 can come within 0.2 dB of the optimal (signal-to-noise ratio margin) performance on a higher level standard noise case. The noise prediction equalizer 330 removes any correlation which may be left in the error signal after the equalization function. The noise prediction equalizer 330 also accelerates convergence within the bit pump 300. Portions of the equalizer can be reconfigured at showtime to become part of the precoder 306.

The bit pump 300 also includes a slicer 328 and a Viterbi decoder/demapper 331 coupled to a summing node with the equalizer in the receive path. The slicer 328 is a symbol-by-symbol decoder configured to slice pulse amplitude modulated signals in the bit pump 300 including signals associated with the echo canceling stage 325. The Viterbi decoder/demapper 331 decodes a 512-state code recommended in the HDSL2 standard and demaps the receive signal for egress from an output of the receive path of the bit pump 300.

The bit pump 300 also includes a timing recoverer 340 and timing generator 345. The timing recoverer 340 allows very fine control of sampling timing with very little jitter. For example, the transmit jitter in the remote terminal is generally small enough that a jitter echo canceller is not necessary. The timing generator 345 is proximally located between the timing recoverer 340 and the transmitter resampler of the transmitter interpolator/resampler 308 and the receiver resampler 321. The timing recoverer 340 is generally a phase detector and frequency integrator. A burst phase correction and updated frequency estimate are generally computed every 400 symbols by timing recovery and sent to the timing generator 345 to be used to control the transmitter resampler and the receiver resampler 321.

In the timing generator 345 and transmitter and receiver resamplers 321, the nominal sampling rate is $72*F_{baud}$, thereby allowing the sampling phase to be maintained with reference to 72× samples as described above. Additionally, the various elements of the timing generator 345 may be controlled by a central state machine which dictates when transmit and receive samples are to be generated and when transmit and receive input delay lines are to be advanced.

It should be understood, that the representative bit pump 300 is submitted for illustrative purposes only and other bit pump configurations compatible with the principles of the present invention may be employed as the application dictates.

Figure 4:
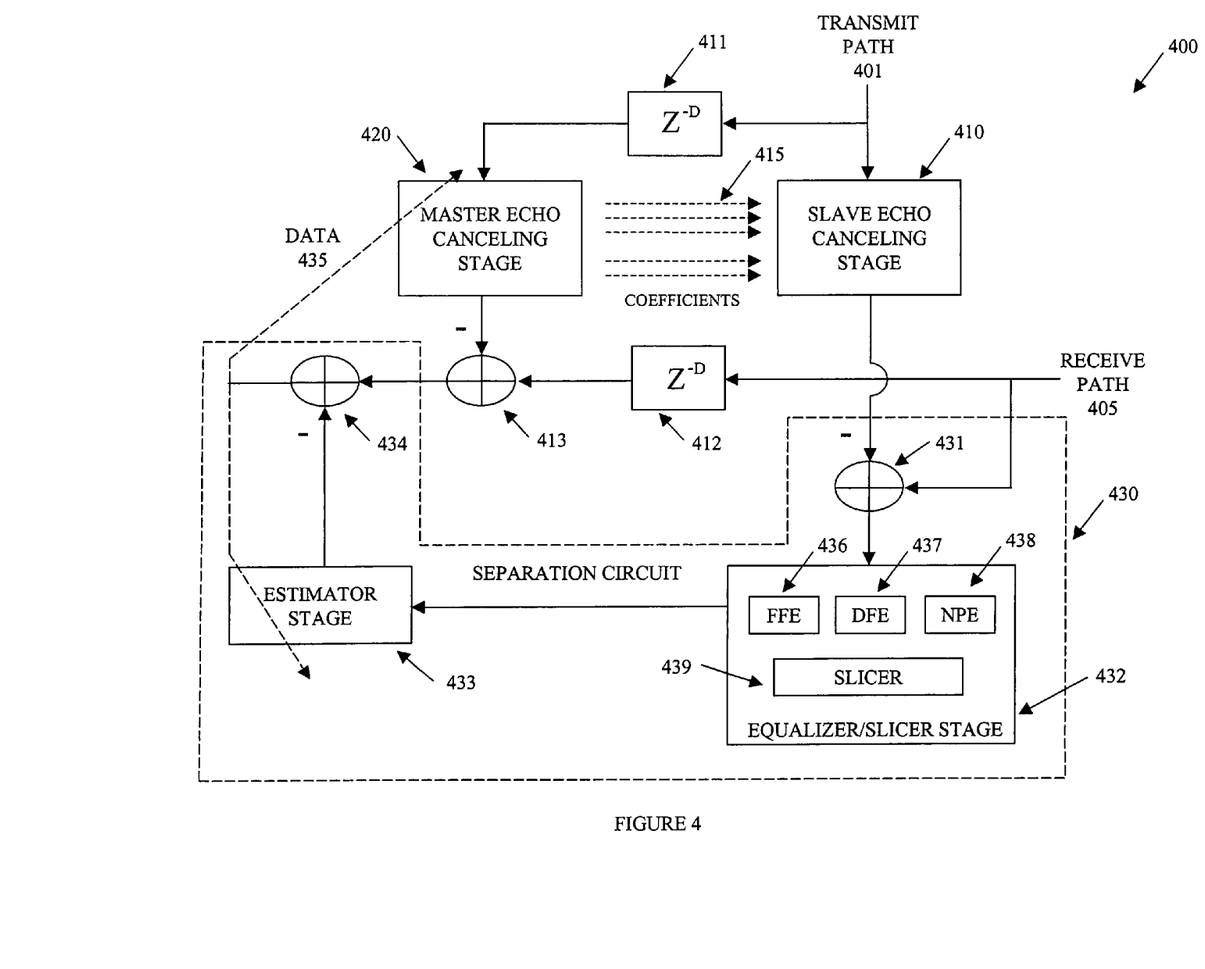
FIG. 4 illustrates a block diagram of an echo canceling system constructed according to the principles of the present invention.

Turning now to FIG. 4, illustrated is a block diagram of an echo canceling system 400 constructed according to the principles of the present invention. The echo canceling system 400 includes a slave echo canceling stage (e.g., a hybrid digital filter) 410 coupled to a transmit path 401 and a master echo canceling stage (e.g., a hybrid digital filter) 420 that generates filter coefficients 415 and is coupled to a transmit path delay 411. The echo canceling system 400 also includes a receive path summing node 413 coupled to the master echo canceling stage 420 and to a receive path delay 412, which is further coupled to a receive path 405.

The echo canceling system 400 also includes a separation circuit 430. The separation circuit 430 includes a first separation summing node 431 coupled to the slave echo canceling stage 410 and the receive path 405. The separation circuit 430 also includes a equalizer/slicer stage 432 coupled to the first separation summing node 431 and an estimator stage 433 coupled to the equalizer/slicer stage 432. The separation circuit 430 also includes a second separator summing node 434 coupled to the estimator stage 433 and to the receive path summing node 413. The master echo canceling stage 420 and the estimator stage 433 are adaptively coupled to receive data 435 from the second separator summing node 434.

The echo canceling system 400 is designed to cancel linear echo over the full dynamic range of a bit pump (such as the bit pump 300 illustrated in FIG. 3) employing the echo canceling system 400 to advantage. In particular, many deviations from an ideal performance of the echo canceling system 400 will have virtually no effect on its loop reach under a low-to-no noise situation. In the illustrated embodiment, the architecture of the echo canceling system 400 incorporates the use of two echo canceling stages, the slave echo canceling stage 410 and the master echo canceling stage 420. The slave echo canceling stage 410 and the master echo canceling stage 420 share the filter coefficients 415, which are created by the master echo canceling stage 420 and stored in a common memory location accessible to both, thereby generating respective echo canceling signals. The slave echo canceling stage 410 performs only the convolution of a transmit signal in the transmit path 401 received from a precoder (e.g., a Tomlinson-Harashima precoder) of the bit pump.

The signal from the precoder and a receive signal in the receive path 405 are appropriately delayed by the transmit and receive path delays 411, 412, respectively. The delay structure accommodates for a signal propagation delay that occurs in the equalizer/slicer stage 432 and the estimator stage 433. The equalizer/slicer stage 432 and the estimator stage 433 cooperate to separate a portion of the receive signal from a residual echo (or a residual level of the echo) that are received from the receive path summing node 413. This action allows the residual echo to become a significant portion of the data 435 from the second separator summing node 434. The data 435 is then used by the master echo canceling stage 420 to adaptively generate the shared filter coefficients 415. Advantageously, the data 435 (representing principally the residual echo) may be further reduced since it is no longer masked by the receive signal. Therefore, the filter coefficients 415 may be generated to reduce the residual echo to a smaller value closer to the ideal value of zero.

Another advantage associated with this architecture is an enhanced capability to accommodate both updates and disturber or other perturbations during showtime operation. A significant perturbation may be caused by a changing or slewing of the ambient temperature during steady-state or showtime operation. The perturbation typically causes a significant degradation in system performance of a conventional echo canceller. In particular, it can account for as much as 4.7 dB of allocated signal-to-noise margin.

In a half duplex operating mode, updating the system parameters does not represent a problem because the system adapts (at the system operating point) with a very high signal-to-noise ratio. However, in a full duplex operating mode, tracking rapid ambient changes may present a substantial problem due to the presence of interfering signals such as the echo for the equalizer/slicer stage 432 and the receive signal for updates to the echo canceling system 400. If the receive signal is considerably greater than the residual echo, the adaptation rates during the full duplex update period may be very slow if a portion of the receive signal is not removed from the data 435. Effectively magnifying the residual echo in the data 435 by removal of a portion of the receive signal provides an enhanced update capability for the echo canceling system 400.

The equalizer portion of the equalizer/slicer 432 includes the a feed forward equalizer 436, a decision feedback equalizer 437 and a noise prediction equalizer 438, which operate as least-mean-square adaptive filters. As previously mentioned, the feed forward equalizer 436 and the decision feedback equalizer 437 cooperate to whiten noise and equalize the linear distortion caused by the channel. The noise prediction equalizer 438 functions to remove any correlation which may be left after equalization. The noise prediction equalizer 438 accelerates training of the echo canceling system 400 during activation. The noise prediction equalizer 438 accelerates convergence of the feed forward equalizer 436 and the decision feedback equalizer 437 of the echo canceling system 400, which may be several decibels short of operational by the end of the activation sequence without the noise prediction equalizer 438. Therefore, use of the noise prediction equalizer 438 in the illustrated embodiment provides a key advantage to the performance of the echo canceling system 400 and to the bit pump employing the echo canceling system 400.

The feed forward equalizer 436, which generally operates at twice the baud rate, is adapted by the least-mean-square algorithm and provides an output that is decimated to the baud rate before further processing. The decision feedback equalizer 437 operates at the baud rate and is adapted by the least-mean-square algorithm. The noise prediction equalizer 438 operates at the baud rate and is also adapted by the least-mean-square algorithm. With the proper timing, the combination of the feed forward equalizer 436 and the decision feedback equalizer 437 can whiten the noise at the input of a slicer 439 thereby offering better performance. The noise prediction equalizer 438, however, whitens the noise at the input of the slicer 439 more quickly.

The decision feedback equalizer 437 and noise prediction equalizer 438 coefficients are initialized to zero. The feed forward equalizer 436 will initialize with a single non-zero tap.

The position of this non-zero tap determines the cursor position within the feed forward equalizer 436. In the illustrated embodiment, the cursor position is at a tap 70 taking into account length verses performance for the feed forward equalizer 436. This position allows the cursor to drift due to temperature changes in the channel, while maintaining acceptable performance.

In the illustrated embodiment, the slicer 439 (a symbol-by-symbol decoder that determines a symbol associated with the receive # signal) slices a 16 pulse-amplitude modulated signal (with modulo) in the echo canceling system 400. The slicer 439 is generally a programmable extended slicer capable of providing 2, 8 or 16 levels and is used to obtain an error signal for the feed forward equalizer 436 during showtime update. Other slicers in the bit pump slice a 2 pulse-amplitude modulated signal (without modulo) and have the capability to slice 4 pulse-amplitude modulated signals and 8 pulse-amplitude modulated signals with modulo, as necessary.

With regard to the estimator stage 433, since the receive signal constitutes a significant impairment to the echo cancellation operation, the receive signal itself should be canceled. The function of the estimator stage 433, therefore, is to approximate the delayed version of the receive signal thereby developing an estimated receive signal. The dynamics of this operation are analogous to linear, fractionally-spaced equalization, which corresponds to a length Wiener solution of the least squares inverse problem.

The estimator stage 433 employs an inverse feed forward equalizer as a channel estimator. The estimator stage 433 includes a finite impulse response filter which uses symbols recovered by the slicer 439. The symbols are resampled to twice the symbol rate to estimate the portion of the receive signal present in the composite signal presented by the receive path summing node 413.

The inverse feed forward equalizer is adapted by using the least-mean-square rule, while attempting to drive the data 435 to zero employed by the master echo canceling stage 420.

A few key performance assumptions for the estimator stage 433 may be summarized as follows. First, the noise signal at the slicer 439 is substantially zero mean and white. This is reasonable since a purpose associated with the feed forward equalizer 436 is to whiten the noise spectrum. Second, the noise signal at the slicer 439 is uncorrelated with the receive symbols. Finally, the receive symbols are substantially white and uncorrelated, due to a standard compliant transmission.

The convergence properties of the estimator stage 433 are limited by the signal-to-noise ratio performance. Asymptotically in both time and inverse feed forward equalizer length, cancellation of the receive signal is approximately equivalent to the signal-to-noise ratio at the slicer 439. With limited training time and length, the estimator stage 433 provides approximately 21 dB of received signal reduction on a central office side and approximately 26 dB of receive signal reduction on a remote terminal side of a communication network employing a transceiver (and bit pump) with the echo canceling system 400. Performance of the estimator stage 433 becomes more important for cases of low signal-to-noise ratio margin. To ensure minimum performance degradation upon commencement of updates to the echo canceling system 400, system training should last until an asymptotic steady state performance is achieved, which is approximately 4 seconds for the illustrated embodiment. Also, the low-end performance of the estimator stage 433 for successful tracking is about 17 db.

Figure 5:
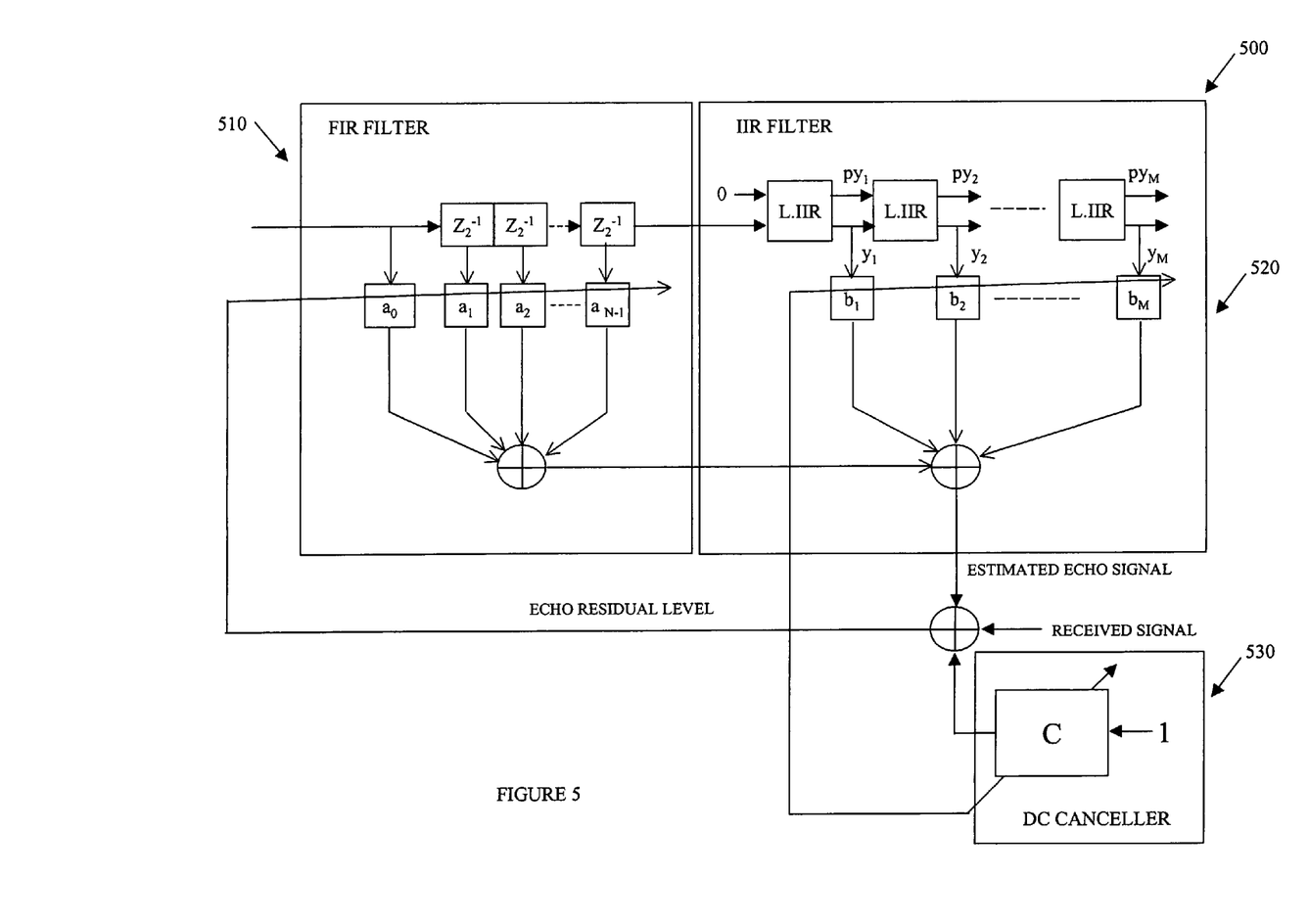
FIG. 5 illustrates a block diagram of an embodiment of an echo canceling stage constructed according to the principles of the present invention.

Turning now to FIG. 5, illustrated is a block diagram of an embodiment of an echo canceling stage 500 constructed according to the principles of the present invention. The echo canceling stage 500 is employable as the slave and master echo canceling stages 410, 420 illustrated and described with respect to FIG. 4. The echo canceling stage 500 includes a finite impulse response filter 510, an infinite impulse response filter 520 and a DC canceller 530. The slave and master echo canceling stages 410, 420 of FIG. 4 incorporate an adaptive structure that is embodied in the two principal filters shown in FIG. 5. The first of these two filters may be an adaptive finite impulse response filter 510 of length N, and the second filter may be an adaptive orthogonal Laguerre infinite impulse response filter 520 of length M.

A principle behind the architecture of the echo canceling stage 500 features a desire to accommodate fast response without sacrificing overall sensitivity. The finite impulse response filter 510 is adapted to cancel fast transients, which typically appear at the beginning of an echo response. Correspondingly, the orthogonal infinite impulse response filter 520 is designed to cancel a tail of the echo response, while adding to the overall flexibility of the echo canceling stage 500. The input to the finite impulse response filter 510 is a zero-inserted signal from an output of the precoder in the illustrated embodiment. All elements in this structure generally operate at twice the baud rate, although multiplications by zero data are not performed.

The orthogonal structure of the Laguerre infinite impulse response filter 520 brings several significant flexibility and performance benefits when compared to implementations employing a single-pole infinite impulse response filter. Computational and implementation complexity are low being virtually the same as a standard, real-pole echo canceller. The hardware implementation of the infinite impulse response filter 520 consists of only one module that is implemented recursively. Such modular implementation allows the order to be increased up to 16 infinite impulse response filters without the addition of hardware. Therefore, compensation for the higher order responses and fast transients can be easily accomplished. Unlike single, real-pole implementations, which can be optimized only for a very limited set of circumstances, the ability to approximate a wide variety of echo responses arising from temperature changes, unknown loops and parameter variations may be accommodated.

The orthogonality of the infinite impulse response filter 520 provides several other benefits. An increase in infinite impulse response order should improve performance. In contrast, the real-pole architecture does not necessarily better performance with the addition of extra sections. The orthogonality of the section also allows for better training in the presence of additive noise. Compared to a 4000 tap finite impulse response echo canceller with near-end crosstalk present, the infinite impulse response filter 520 achieves between about 3 dB and 10 dB enhanced echo cancellation. Additionally, the number of degrees of freedom of the infinite impulse response filter 520 is smaller in comparison to a finite impulse response filter due, in part, to the smaller number of taps. Consequently, the training is faster and the training related noise is smaller.

Due to its orthogonal structure, the performance surface of the infinite impulse response filter 520 is unimodal allowing a less complex least-mean-square algorithm to be used to achieve a global set of coefficients. In contrast, real-pole architectures and infinite impulse response adaptive filters in general do not always provide unimodality of the optimization surface and therefore may be trapped in the locally optimal solutions. Unlike the case of general adaptive infinite impulse response filters, the stability of the Laguerre infinite impulse response filter 520 is inherited from the structure. Finally, the possibility of simple-pole adaptation, and a general insensitivity to pole selection are possible.

In the presence of fixed-point blocks, such as analog-to-digital or digital-to-analog converters, there is a possibility of a parasitic DC component in the canceled echo signal. While this component does not affect the root-mean-square value of the residual echo, it presents a problem for the feed forward equalizer 436 and the decision feedback equalizer 437 combination due to the lack of transmitted signal. This artifact may account for as much as 1 dB of mean square error for the slicer 439 at steady state operation.

The DC canceller 530 may be incorporated into the echo canceling stage 500 to prevent this degradation. The DC canceller 530 consists of a single-tap least-mean-square filter, which adapts to a steady value of one. Early adaptation for the DC canceller 530 is required to allow for correct timing recovery training. The precision of the DC canceller 530 is designed to handle offsets up to 10% of the full dynamic range of the receive signal. During a tracking period, the DC canceller 530 may accommodate swings between extreme values within five minutes. The DC canceller 530 may converge to zero, which provides for insignificant intrinsic DC offset in the echo path.

It should be understood, that the embodiments of the echo canceling system and echo canceling stage illustrated and described with respect to the preceding FIGUREs are submitted for illustrative purposes only and other configurations compatible with the principles of the present invention may be employed as the application dictates.

In summary, the present invention introduces, in one aspect, an echo canceling system employable in a bit pump, which is the digital signal processing portion of a transceiver. The transceiver is employable in the environment of a high-bit-rate digital subscriber line service over a single twisted pair wire, commonly referred to as HDSL2. The echo canceling system advantageous employs master and slave echo canceling stages and a separation circuit to attenuate the echo. The separation circuit distinguishes a residual echo from the receive signal for use by the master echo canceling stage. The master echo canceling stage adapts filter coefficients that are employable by the slave echo canceling stage to attenuate the echo. As a result, the echo canceling system reduces the echo to levels not previously attainable, thereby increasing the fidelity of communication traffic (e.g., voice, video or data) traversing a network employing the bit pump.

For a better understanding of digital communications, in general, and digital subscriber line services including the standards and systems that support the technology, see "Understanding Digital Subscriber Line Technology" by Thomas Starr, Peter Silverman, and John M. Coiffi, Prentice Hall (1998), and "Digital Communication" by Edward A. Lee and David G. Messerschmitt, Kluwer Academic Publishers (1994), which are incorporated herein by reference.

Although the present invention has been described in detail, those skilled in the art should understand that they can make various changes, substitutions and alterations herein without departing from the spirit and scope of the invention in its broadest form.

What is claimed is:

1. A bit pump having a transmit path and a receive path, comprising:
   a precoder, coupled to said transmit path, to precondition a transmit signal propagating along said transmit path;
   a modulator, coupled to said precoder, to reduce a noise associated with said transmit signal;
   an analog-to-digital converter, coupled to said receive path, to convert a receive signal received at said bit pump into a digital format;
   a decimator, coupled to said analog-to-digital converter, to downsample said receive signal propagating along said receive path; and
   an echo canceling system, coupled between said transmit and receive path, to attenuate an echo in said receive signal, including:
      a slave echo canceling stage to employ a filter coefficient to attenuate said echo,
      a separation circuit, coupled to said slave echo canceling stage, to generate data representing a residual echo substantially exclusive of said receive signal, and
      a master echo canceling stage, coupled to said separation circuit, to receive said data and modify said filter coefficient based thereon.

2. The bit pump as recited in claim 1 wherein said master and slave echo canceling stages receive said transmit signal, said transit signal being delayed to said master echo canceling stage.

3. The bit pump as recited in claim 1 wherein said separation circuit comprises an equalizer/slicer stage to determine a symbol associated with said receive signal.

4. The bit pump as recited in claim 3 wherein said separation circuit further comprises an estimator stage, coupled to said equalizer/slicer stage, to employ said symbol and develop an estimated receive signal.

5. The bit pump as recited in claim 4 wherein master echo canceling stage generates an echo canceling signal and said separation circuit generates said data representing said residual echo as a function of said estimated receive signal, said echo canceling signal and a delayed receive signal.

6. The bit pump as recited in claim 1 wherein said master and slave echo canceling stages each comprise finite impulse response filters and infinite impulse response filters.

7. The bit pump as recited in claim 1 wherein said master and slave echo canceling stages each comprise a DC canceller.

8. A transceiver, comprising:
a framer to format signals within said transceiver;
a bit pump coupled to said framer and having a transmit path and a receive path, including:
a precoder, coupled to said transmit path, to precondition a transmit signal propagating along said sit path;
a modulator, coupled to said precoder, to reduce a noise associated with said transmit signal;
an analog-to-digital converter, coupled to said receive path, to convert a receive signal received at said bit pump into a digital format;
a decimator, coupled to said analog-to-digital converter, to downsample said receive signal propagating along said receive path; and
an echo canceling system, coupled between said transmit and receive path, to attenuate an echo in said receive signal, including:
a slave echo canceling stage to employ a filter coefficient to attenuate said echo,
a separation circuit, coupled to said slave echo canceling stage, to generate data representing a residual echo substantially exclusive of said receive signal, and
a master echo canceling stage, coupled to said separation circuit, to receive said data and modify said filter coefficient based thereon; and
a controller to control an operation of said framer and said bit pump.

9. The transceiver as recited in claim 8 wherein said master and slave echo canceling stages receive said transmit signal, said transmit signal being delayed to said master echo canceling stage.

10. The transceiver as recited in claim 8 wherein said separation circuit comprises an equalizer/slicer stage to determine a symbol associated with said receive signal.

11. The transceiver as recited in claim 10 wherein said separation circuit further comprises an estimator stage, coupled to said equalizer/slicer stage, to employ said symbol and develop an estimated receive signal.

12. The transceiver as recited in claim 11 wherein master echo canceling stage generates an echo canceling signal and said separation circuit generates said data representing said residual echo as a function of said estimated receive signal, said echo canceling signal and a delayed receive signal.

13. The transceiver as recited in claim 8 wherein said master and slave echo canceling stages each comprise finite impulse response filters and infinite impulse response filters.

14. The transceiver as recited in claim 8 wherein said master and slave echo canceling states each comprise a DC canceller.

* * * * *